United States Patent
Hara

(10) Patent No.: US 10,131,404 B2
(45) Date of Patent: Nov. 20, 2018

(54) BICYCLE FRONT DERAILLEUR

(71) Applicant: Shimano Inc., Sakai, Osaka (JP)

(72) Inventor: Nobukatsu Hara, Osaka (JP)

(73) Assignee: Shimano Inc., Osaka (JP)

(*) Notice: Subject to any disclaimer, the term of this patent is extended or adjusted under 35 U.S.C. 154(b) by 148 days.

(21) Appl. No.: 15/428,413

(22) Filed: Feb. 9, 2017

(65) Prior Publication Data

US 2018/0222551 A1    Aug. 9, 2018

(51) Int. Cl.
| | | |
|---|---|---|
| *F16H 9/00* | (2006.01) | |
| *F16H 59/00* | (2006.01) | |
| *F16H 61/00* | (2006.01) | |
| *F16H 63/00* | (2006.01) | |
| *B62M 9/1342* | (2010.01) | |

(52) U.S. Cl.
CPC ................. *B62M 9/1342* (2013.01)

(58) Field of Classification Search
CPC .... B62M 9/1342; B62M 9/137; B62M 9/136; B62M 9/135; B62M 2025/006
USPC ...................................... 474/80, 82
See application file for complete search history.

(56) References Cited

U.S. PATENT DOCUMENTS

| | | | | |
|---|---|---|---|---|
| 5,496,222 A * | 3/1996 | Kojima | ................ | B62M 9/1342 474/80 |
| 5,779,580 A * | 7/1998 | White | .................. | B62M 9/1342 474/80 |
| 6,099,425 A * | 8/2000 | Kondo | ................... | B62M 9/137 474/127 |
| 6,234,927 B1 * | 5/2001 | Peng | .................... | B62M 9/1342 474/80 |
| 6,443,032 B1 * | 9/2002 | Fujii | ....................... | B62M 9/04 474/82 |
| 7,438,657 B2 * | 10/2008 | Nakai | .................. | B62M 9/1342 474/80 |
| 8,303,443 B2 * | 11/2012 | Wickliffe | ............. | B62M 9/1342 474/80 |
| 8,439,779 B2 * | 5/2013 | Florczyk | ................ | B62M 9/135 474/80 |
| 8,663,043 B2 | 3/2014 | Auer et al. | | |
| 9,216,794 B2 * | 12/2015 | Emura | ................... | B62M 9/134 |
| 9,926,039 B2 * | 3/2018 | Emura | ................... | B62M 9/134 |
| 2003/0100393 A1 * | 5/2003 | Nanko | ................ | B62M 9/1342 474/80 |

(Continued)

*Primary Examiner* — Henry Y Liu
(74) *Attorney, Agent, or Firm* — Global IP Counselors, LLP

(57) ABSTRACT

A bicycle front derailleur is basically provided with a base member, a chain guide, a link mechanism, and a biasing member. The base member is configured to be fixedly coupled to the bicycle. The chain guide is configured to guide a chain. The link mechanism couples the chain guide to the base member between retracted and extended positions in response to movement of an operation cable. The link mechanism includes a first link pivotally connected to the chain guide about a first pivot axis. The first link is configured such that the first pivot axis moves in a forward-rearward direction, while the chain guide moves between the retracted position and the extended position in a mounted state where the base member is mounted to a bicycle frame. The biasing member is operatively disposed between the base member and the chain guide to bias the chain guide towards the extended position.

18 Claims, 9 Drawing Sheets

(56) References Cited

U.S. PATENT DOCUMENTS

| | | | |
|---|---|---|---|
| 2004/0005950 A1* | 1/2004 | Tetsuka | B62M 25/02 474/80 |
| 2007/0135249 A1* | 6/2007 | Nanko | B62M 9/1342 474/80 |
| 2011/0224037 A1* | 9/2011 | Auer | B62M 9/137 474/82 |
| 2014/0349793 A1* | 11/2014 | Emura | B62M 9/134 474/80 |
| 2017/0036736 A1* | 2/2017 | Duweling | B62M 9/1342 |
| 2017/0240246 A1* | 8/2017 | Emura | B62M 9/134 |
| 2017/0274962 A1* | 9/2017 | Emura | B62K 25/286 |
| 2017/0283005 A1* | 10/2017 | Inoue | B62M 9/00 |

* cited by examiner

BICYCLE FRONT DERAILLEUR

BACKGROUND

Field of the Invention

This invention generally relates to a bicycle front derailleur. More specifically, the present invention relates to a bicycle front derailleur having a chain guide that is movable between a retracted position and an extended position to move a bicycle chain between front sprockets.

Background Information

Many bicycles are provided with a drivetrain that allows the rider to change a gear ratio for transferring power from the pedals to the rear wheel. Often the drivetrain uses one or more derailleurs to change the gear ratio. A front derailleur is mounted to the bicycle frame adjacent to front sprockets to shift a chain laterally between the front sprockets, while a rear derailleur is mounted adjacent to a hub of the rear wheel to shift the chain laterally between rear sprockets. In either case, the derailleur typically includes a fixed or base member that is non-movably secured to the bicycle frame, and a chain guide. The chain guide is movably supported relative to the base member to move between at least two lateral shift positions. Typically, a linkage assembly is coupled between the fixed member and the chain guide in order to movably support the movable member with the chain guide. The derailleur is typically operated by an operation cable that is coupled between a shifter and the derailleur.

SUMMARY

Generally, the present disclosure is directed to various features of a bicycle front derailleur.

In view of the state of the known technology and in accordance with a first aspect of the present disclosure, a bicycle front derailleur is basically provided that includes a base member, a chain guide, a link mechanism, and a biasing member. The base member is configured to be fixedly coupled to a bicycle. The chain guide is configured to guide a chain. The link mechanism couples the chain guide to the base member between a retracted position and an extended position in response to a movement of an operation cable. The link mechanism includes a first link pivotally connected to the chain guide about a first pivot axis. The first link is configured such that the first pivot axis moves in a forward-rearward direction, while the chain guide moves between the retracted position and the extended position in a mounted state where the base member is mounted to a bicycle frame. The biasing member is operatively disposed between the base member and the chain guide to bias the chain guide towards the extended position. According to the first aspect of the present invention, a bicycle front derailleur is provided in which it is possible to quickly shift a bicycle chain from a larger front sprocket toward a smaller front sprocket even under high chain tension during pedaling.

In accordance with a second aspect of the present invention, the bicycle front derailleur according to the first aspect is configured to include a cable guiding structure configured to guide the operation cable such that the operation cable pulls the link mechanism in a first direction with respect to the base member as the operation cable is pulled in a second direction different from the first direction. According to the second aspect of the present invention, a bicycle front derailleur is provided in which it is possible to quickly shift a bicycle chain from a larger front sprocket toward a smaller front sprocket even under high chain tension during pedaling.

In accordance with a third aspect of the present invention, a bicycle front derailleur is basically provided that includes a base member, a chain guide, a link mechanism and a cable guiding structure. The base member is configured to be fixedly coupled to a bicycle. The chain guide is configured to guide a chain. The link mechanism couples the chain guide to the base member between a retracted position and an extended position in response to a movement of an operation cable. The link mechanism includes a first link pivotally connected to the chain guide about a first pivot axis. The first link is configured such that the first pivot axis moves in a forward-rearward direction, while the chain guide moves between the retracted position and the extended position, in a mounted state where the base member is mounted to the bicycle frame. The cable guiding structure is configured to guide the operation cable such that the operation cable pulls the link mechanism in a first direction toward a first reference plane as the operation cable is pulled in a second direction toward a second reference plane that faces the first reference plane. According to the third aspect of the present invention, a bicycle front derailleur is provided in which it is possible to quickly shift a bicycle chain from a larger front sprocket toward a smaller front sprocket even under high chain tension during pedaling.

In accordance with a fourth aspect of the present invention, the bicycle front derailleur according to any one of the first to third aspects is configured so that the link mechanism includes a second link pivotally connected to the chain guide about a second pivot axis. The second link is configured such that the second pivot axis moves in the forward-rearward direction, while the chain guide moves between the retracted position and the extended position in the mounted state. According to the fourth aspect of the present invention, a bicycle front derailleur is provided in which it is possible to quickly shift a bicycle chain from a larger front sprocket toward a smaller front sprocket even under high chain tension during pedaling.

In accordance with a fifth aspect of the present invention, a bicycle front derailleur is basically provided that includes a base member, a chain guide, a link mechanism, a cable guiding structure and a biasing member. The base member is configured to be fixedly coupled to a bicycle frame. The chain guide is configured to guide a chain. The link mechanism movably couples the chain guide to the base member between a retracted position and an extended position in response to a movement of an operation cable. The cable guiding structure is configured to guide the operation cable so as to be pulled forwardly from the cable guiding structure within a sector having an angle of 150 degrees around the crank axis from an upper radius lying in a first plane that is perpendicular to a second plane containing the crank axis and the rear wheel axis in a mounted where the base member is mounted to the bicycle frame. The biasing member is operatively disposed between the base member and the chain guide to bias the chain guide towards the extended position. According to the fifth aspect of the present invention, a bicycle front derailleur is provided in which it is possible to quickly shift a bicycle chain from a larger front sprocket toward a smaller front sprocket even under high chain tension during pedaling and to minimize bending of the operation cable.

In accordance with a sixth aspect of the present invention, the bicycle front derailleur according to the fifth aspect is configured so that the link mechanism includes a first link and a second link pivotally connected to the chain guide. According to the sixth aspect of the present invention, a bicycle front derailleur is provided in which it is possible to efficiently and stably move the chain guide.

In accordance with a seventh aspect of the present invention, the bicycle front derailleur according to any one of the second to sixth aspects is configured to include a cable attachment portion that is configured to be attached to an operation cable. According to the seventh aspect of the present invention, a bicycle front derailleur is provided in which it is possible to provide smooth operation of the operation cable.

In accordance with an eighth aspect of the present invention, the bicycle front derailleur according to the seventh aspect is configured so that the first link is disposed closer to the bicycle frame than the second link in the mounted state, and the cable attachment portion is disposed on the first link. According to the eighth aspect of the present invention, a bicycle front derailleur is provided in which it is possible to minimize bending of the operation cable to provide smooth operation thereof.

In accordance with a ninth aspect of the present invention, the bicycle front derailleur according to the eighth aspect is configured so that the cable attachment portion protrudes from the first link in a direction away from the bicycle frame in the mounted state. According to the ninth aspect of the present invention, a bicycle front derailleur is provided in which it is possible to minimize bending of the operation cable to provide smooth operation thereof.

In accordance with a tenth aspect of the present invention, the bicycle front derailleur according to the seventh aspect is configured so that the cable attachment portion is disposed on the base member. According to the tenth aspect of the present invention, a bicycle front derailleur is provided in which it is possible to efficiently route the operation cable.

In accordance with an eleventh aspect of the present invention, the bicycle front derailleur according to the second or third aspect is configured so that the second direction is generally opposite to the first direction. According to the eleventh aspect of the present invention, a bicycle front derailleur is provided in which it is possible to smoothly operate the operation cable.

In accordance with a twelfth aspect of the present invention, the bicycle front derailleur according to any one of the second to eleventh aspects is configured so that the cable guiding structure is disposed to the base member. According to the twelfth aspect of the present invention, a bicycle front derailleur is provided in which it is possible to efficiently route the operation cable.

In accordance with a thirteenth aspect of the present invention, the bicycle front derailleur according to any one of the second to twelfth aspects is configured so that the cable guiding structure includes an outer casing receiving portion. According to the thirteenth aspect of the present invention, a bicycle front derailleur is provided in which it is possible to smoothly operate the operation cable.

In accordance with a fourteenth aspect of the present invention, the bicycle front derailleur according to any one of the second to thirteenth aspects is configured so that the cable guiding structure includes an inner cable guiding portion. According to the fourteenth aspect of the present invention, a bicycle front derailleur is provided in which it is possible to smoothly operate the operation cable.

In accordance with a fifteenth aspect of the present invention, the bicycle front derailleur according to any one of the second to fourteenths aspect is configured so that the cable guiding structure includes a rotatable pulley. According to the fifteenth aspect of the present invention, a bicycle front derailleur is provided in which it is possible to smoothly operate the operation cable.

In accordance with a sixteenth aspect of the present invention, the bicycle front derailleur according to any one of the seventh to fifteenth aspects is configured so that the cable guiding structure is at least partially disposed rearward from the cable attachment portion in the mounting state. According to the sixteenth aspect of the present invention, a bicycle front derailleur is provided in which it is possible to efficiently route the operation cable.

In accordance with a seventeenth aspect of the present invention, the bicycle front derailleur according to any one of the seventh to sixteenth aspects is configured so that the cable guiding structure includes a cable exit that is disposed rearward from the cable attachment portion in the mounting state. According to the seventeenth aspect of the present invention, a bicycle front derailleur is provided in which it is possible to smoothly operate the operation cable.

In accordance with an eighteenth aspect of the present invention, the bicycle front derailleur according to any one of the fourth to seventeenth aspects is configured so that the cable guiding structure includes a cable exit that is disposed closer to the bicycle frame than the cable attachment portion in the mounting state. According to the eighteenth aspect of the present invention, a bicycle front derailleur is provided in which it is possible to smoothly operate the operation cable.

Also other objects, features, aspects and advantages of the disclosed bicycle front derailleur will become apparent to those skilled in the art from the following detailed description, which, taken in conjunction with the annexed drawings, discloses several illustrative embodiments of a bicycle front derailleur.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the bicycle field from this disclosure that the following descriptions of the exemplary embodiments are provided for illustration only and not for the purpose of limiting the invention as defined by the appended claims and their equivalents.

Figure 1:
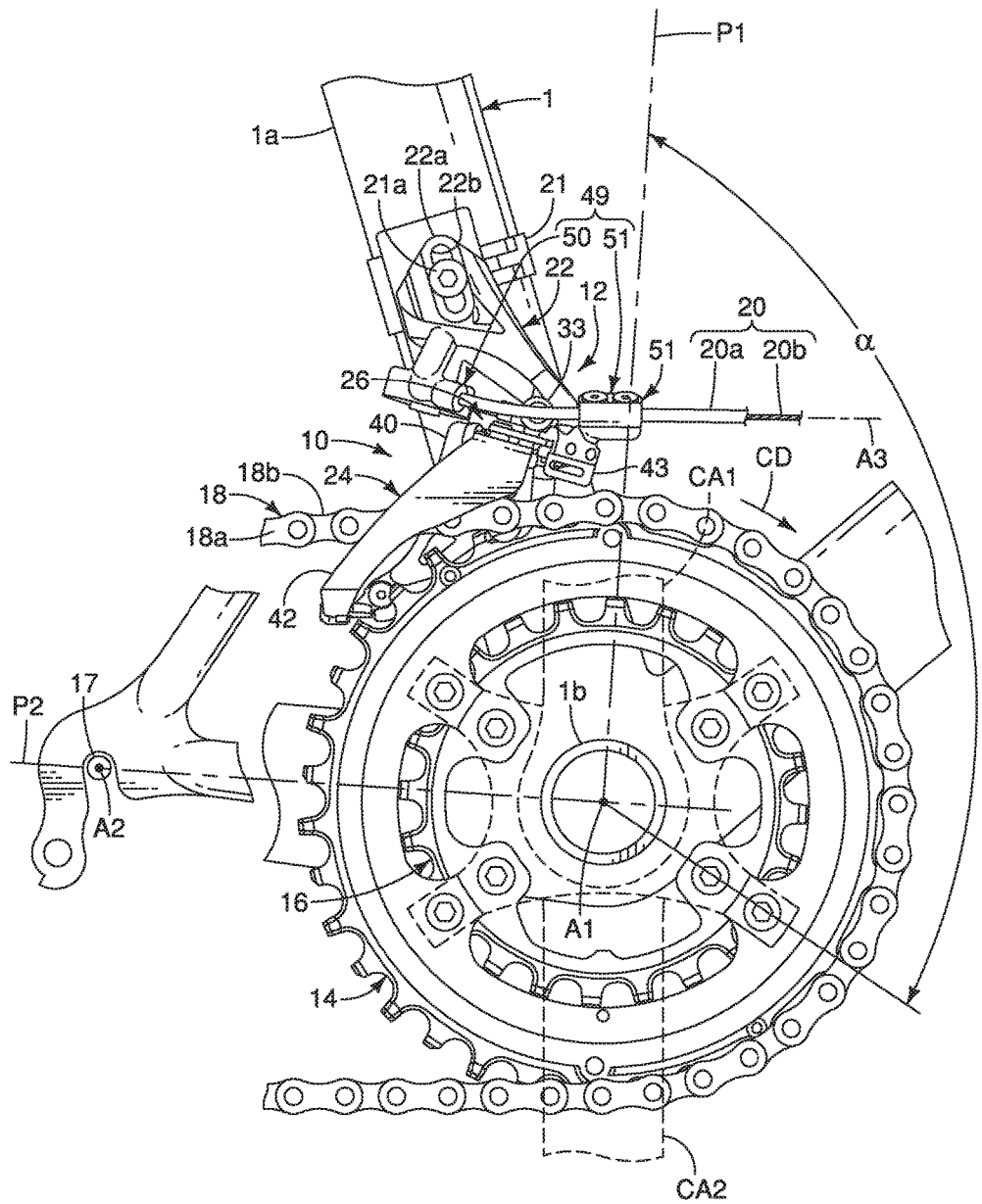
FIG. 1 is a partial side elevational view of a bicycle frame with a bicycle drive train assembly that includes a bicycle front derailleur, a first sprocket and a second sprocket with the bicycle front derailleur having a base member mounted to the bicycle frame for shifting a bicycle chain between the first and second sprockets in accordance with a first illustrated embodiment.

Referring initially to FIG. 1, a portion of a bicycle frame 1 is illustrated that is equipped with a bicycle drive train assembly 10 that includes a bicycle front derailleur 12 (hereinafter "the front derailleur 12") in accordance with a first exemplary embodiment. The front derailleur 12 shown in FIGS. 1 to 10 is a side swing, top normal front derailleur. The bicycle drive train assembly 10 further comprises a first sprocket 14 and a second sprocket 16. The first and second sprockets 14 and 16 are rotated by a pair of crank arms CA1 and CA2 to rotate about a rotational center axis, or crank axis, A1. The bicycle front derailleur 12 is attached to a bicycle having the crank axis A1 and a rear wheel axis A2 which is parallel to the crank axis, or rotational center axis, A1. The crank axis A1 is defined by a hanger tube 1b of the bicycle frame 1. In other words, the crank axis A1 corresponds to a center longitudinal axis of the hanger tube 1b and thus also corresponds to the rotational center axis A1 of the first sprocket 14. The rear wheel axis A2 is defined by a center axle 17 of the rear wheel.

The first sprocket 14 is a larger front sprocket with respect to the second sprocket 16, which is an adjacent smaller front sprocket with respect to the first sprocket 14. While the bicycle drive train assembly 10 is illustrated with only two front sprockets, it will be apparent to those skilled in the bicycle field from this disclosure that the bicycle drive train assembly 10 can include more than two front sprockets if needed and/or desired.

Basically, the front derailleur 12 is configured to laterally shift a bicycle chain 18 between the first and second sprockets 14 and 16. Here, the front derailleur 12 is a cable operated front derailleur that is operatively connected to a shifter (not shown) using an operation cable 20. However, the front derailleur 12 can be configured to be operated in other ways, such as electrically operated, hydraulically operated or pneumatically operated.

In the first exemplary embodiment, the operation cable 20 includes an outer casing 20a and an inner cable 20b passing through the outer casing 20a. Thus, in the illustrated exemplary embodiment, the operation cable 20 is a conventional Bowden cable. The inner cable 20b is slidably disposed inside the outer casing 20a. In particular, operation of the shifter (not shown) moves (i.e., pulls or releases) the inner cable 20b inside the outer casing 20a to operate the front derailleur 12. The outer casing 20a can be formed as a single continuous tubular member with one end contacting a part of the shifter (not shown) and the other end contacting the front derailleur 12, as illustrated. Alternatively, the outer casing 20a can be formed of two or more pieces as is commonly done on many bicycles.

In the first exemplary embodiment, as seen in FIG. 1, the front derailleur 12 is mounted on the bicycle frame 1 using a conventional bracket, such as a seat tube clamp 21. The seat tube clamp 21, as shown in FIG. 1, mounts the front derailleur 12 to a seat tube 1a of the bicycle frame 1. However, it will be apparent to those skilled in the bicycle field from this disclosure that the front derailleur 12 can be attached to the bicycle frame 1 in any conventional manner, as needed and/or desired.

Referring now to FIGS. 2 to 12, the bicycle front derailleur 12 will now be described in more detail. The bicycle front derailleur 12 basically comprises a base member 22, a chain guide 24 and a link mechanism 26. Basically, in the first exemplary embodiment, the base member 22 is configured to be fixedly coupled to the bicycle, such as to the bicycle frame 1, in a conventional manner. The chain guide 24 is configured to guide the bicycle chain 18. The link mechanism 26 couples the chain guide 24 to the base member 22 between a retracted position and an extended position in response to a movement of an operation cable 20. In other words, the link mechanism 26 movably couples the chain guide 24 to the base member 22 between a retracted position (see FIGS. 5 and 8) and an extended position (see FIGS. 4 and 7), at which the chain guide 24 is farther from the base member 22 than the retracted position in an axial direction parallel to the rotational center axis A1, in response to a movement of the operation cable 20.

The link mechanism 26 further comprises a first link 31 and a second link 32 that interconnect the base member 22 and the chain guide 24 together for lateral movement with respect to the bicycle frame 1. In other words, the first and second links 31 and 32 define the link mechanism 26 for movably supporting the chain guide 24 with respect to the base member 22 between the extended position (see FIGS. 4 and 7) and the retracted position (see FIGS. 5 and 8). The first and second links 31 and 32 are each a rigid member that are made of a suitable material, such as a metallic material or a fiber reinforced plastic material. Here in the illustrated exemplary embodiment, the first link 31 is an inner link, while the second link 32 is an outer link.

Figure 5:
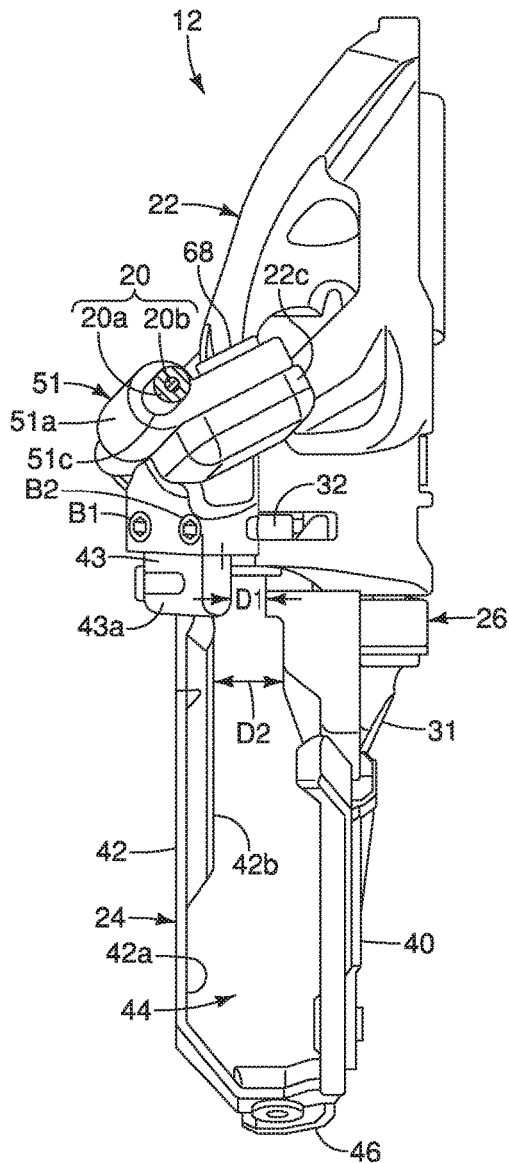
FIG. 5 is an enlarged front end elevational view of the bicycle front derailleur illustrated in FIGS. 1 to 4 with the chain guide in a retracted position with respect to the base member.
Figure 6:
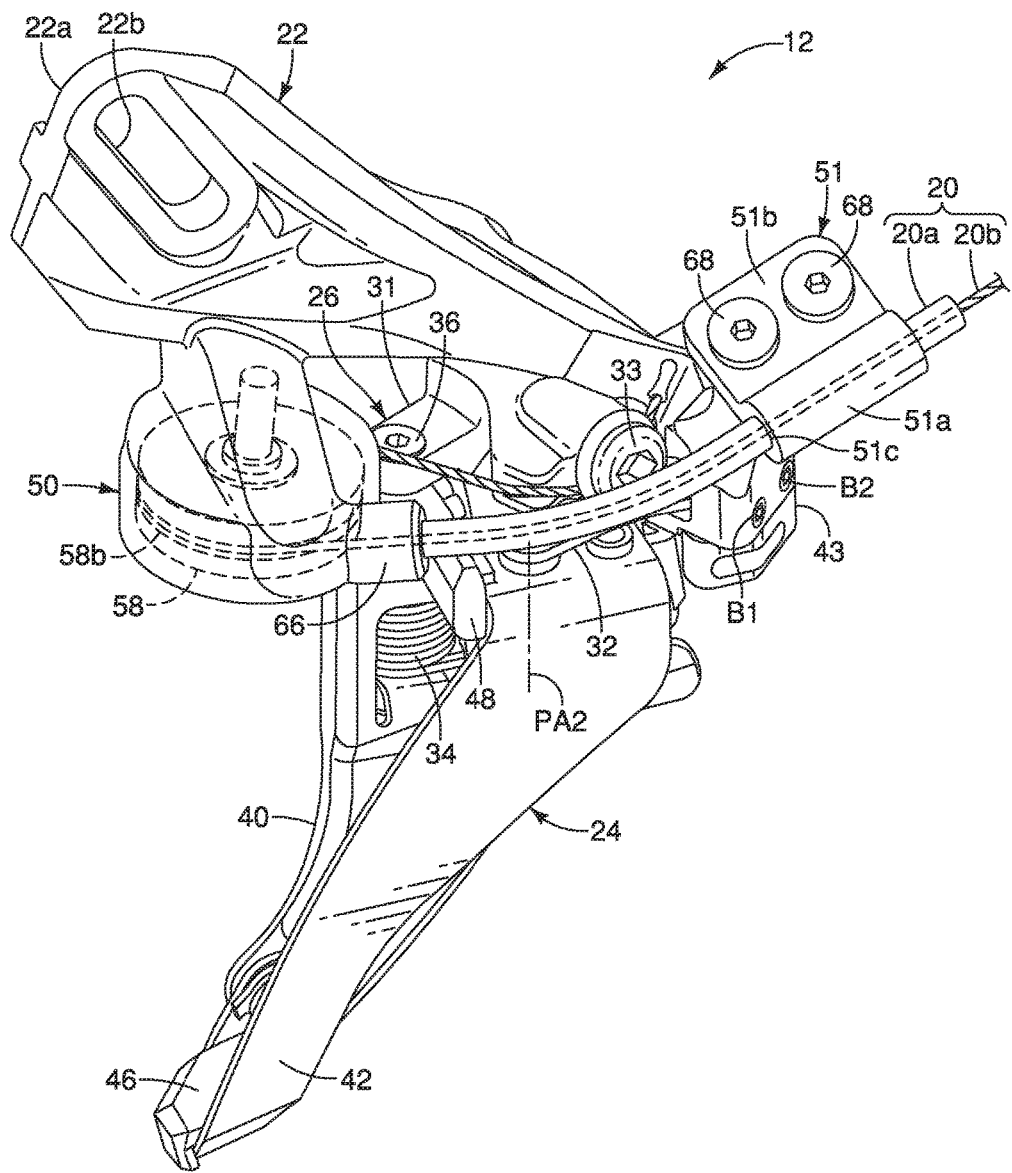
FIG. 6 is an enlarged top perspective view of the bicycle front derailleur illustrated in FIGS. 1 to 5.
Figure 7:
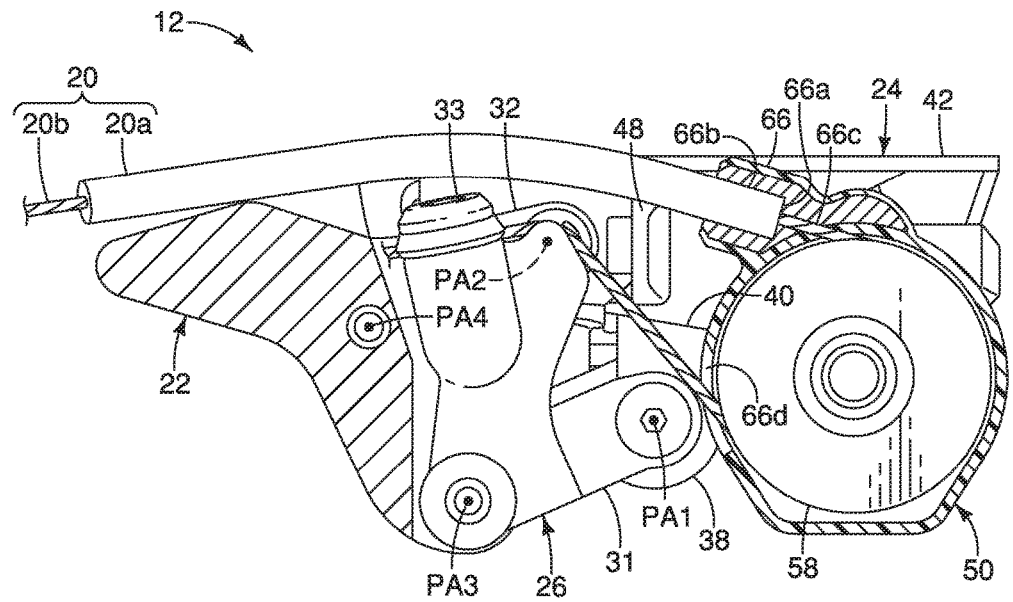
FIG. 7 is an enlarged top view of the bicycle front derailleur illustrated in FIGS. 1 to 6 with the chain guide in the extended position with respect to the base member.
Figure 8:
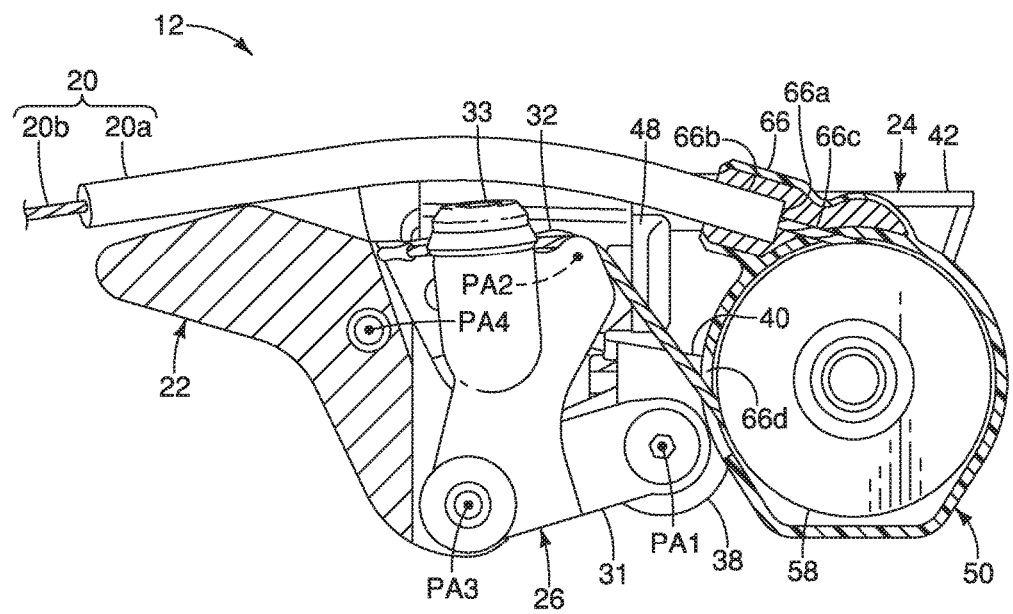
FIG. 8 is an enlarged top view of the bicycle front derailleur illustrated in FIGS. 1 to 7 with the chain guide in the retracted position with respect to the base member.

The link mechanism 26 includes the first link 31 and the second link 32 pivotally connected to the chain guide 24. The first link 31 is pivotally connected to the chain guide 24 about a first pivot axis PA1, as shown in FIGS. 7 and 8. The second link 32 is pivotally connected to chain guide 24 about a second pivot axis PA2. The first link 31 is pivotally connected to the base member 22 about a third pivot axis PA3. The second link 32 is pivotally coupled to the base member 22 about a fourth pivot axis PA4. With this arrangement, as seen in FIGS. 7 and 8, a four bar linkage is defined by the pivot axes PA1, PA2, PA3 and PA4. Also, with the arrangement of the first and second links 31 and 32, the movement of the chain guide 24 is in a generally horizontal plane such that the chain guide 24 swings in a forward and rear direction with respect to the bicycle frame 1 as the chain guide 24 swings laterally with respect to the bicycle frame 1 between the extended position (see FIGS. 4 and 7) and the retracted position (see FIGS. 5 and 8). A cable attachment portion 33 is screwed into a threaded bore of the first link 31 for fixedly attaching the inner cable 20b to the first link 31, as shown in FIGS. 6 to 9. The cable attachment portion 33 is disposed on the first link 31. As shown in FIGS. 1 and 6, the cable attachment portion 33 protrudes from the first link 31 in a direction away from the bicycle frame 1. Alternatively, the cable attachment portion 33 can be disposed on the second link 32 or on the base member 22 (as described below with reference to a second exemplary embodiment).

Figure 2:
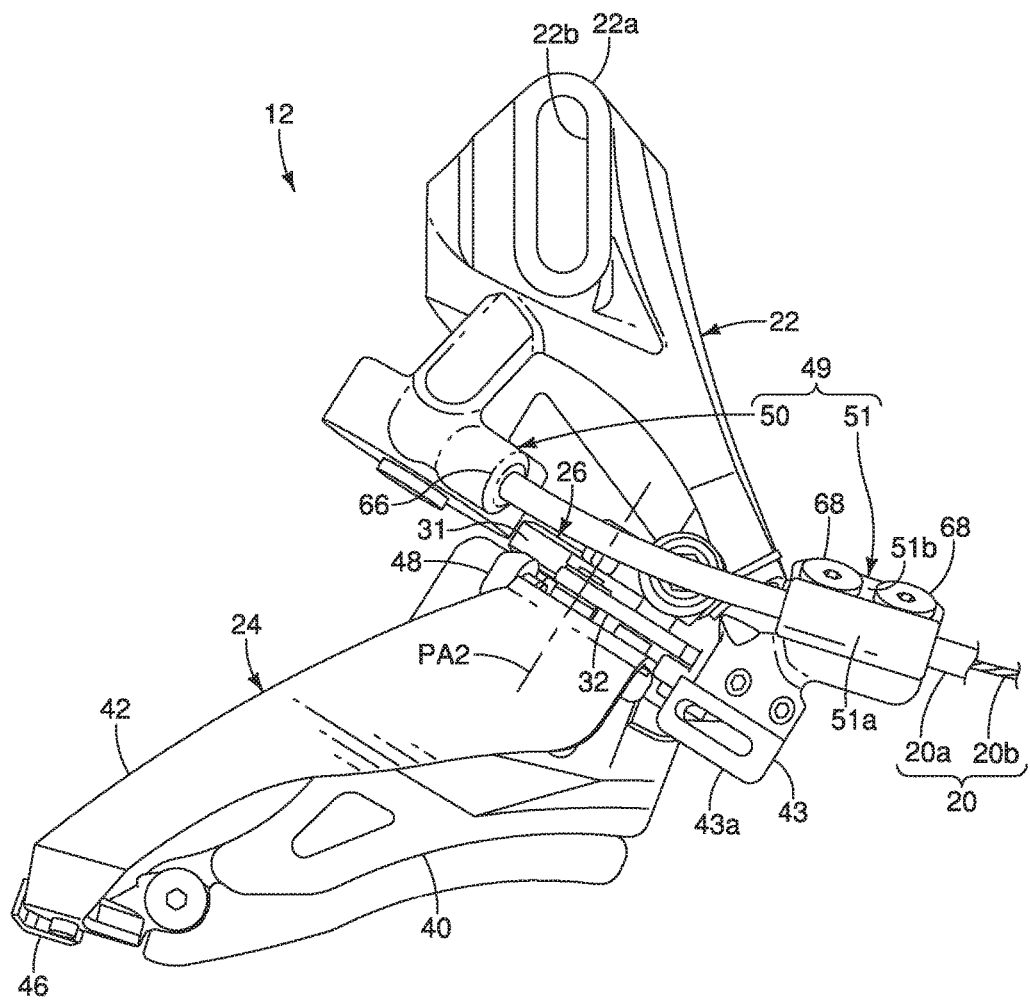
FIG. 2 is an enlarged outer side elevational view of the bicycle front derailleur illustrated in FIG. 1.
Figure 4:
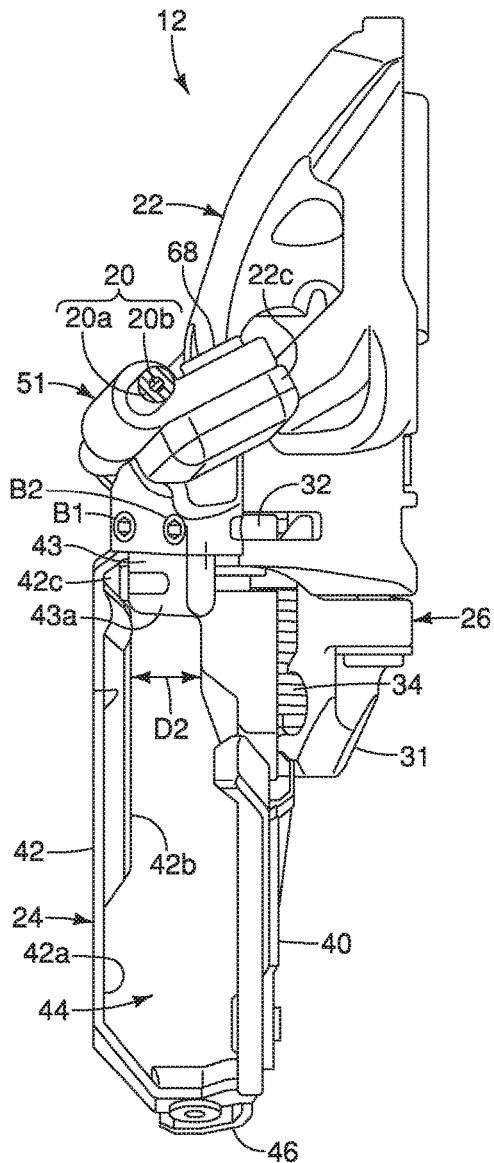
FIG. 4 is an enlarged front end elevational view of the bicycle front derailleur illustrated in FIGS. 1 to 3 with the chain guide in an extended position with respect to the base member.

The first link 31 is configured such that the first pivot axis PA1 moves in a forward-rearward direction, while the chain guide 24 moves between the retracted position (see FIGS. 5 and 8) and the extended position (see FIGS. 4 and 7), in a mounted state where the base member 22 is mounted to the bicycle frame 1, as shown in FIGS. 1, 4 and 7. The second link 32 is configured such that the second pivot axis PA2 moves in the forward-rearward direction, while the chain guide 24 moves between the retracted position (see FIGS. 5 and 8) and the extended position (see FIGS. 4 and 7), in the mounted state where the base member 22 is mounted to the bicycle frame 1. As shown in FIGS. 1, 2 and 6, the first link 31 is disposed closer to the bicycle frame 1 than the second link 32 in the mounted state.

Figure 3:
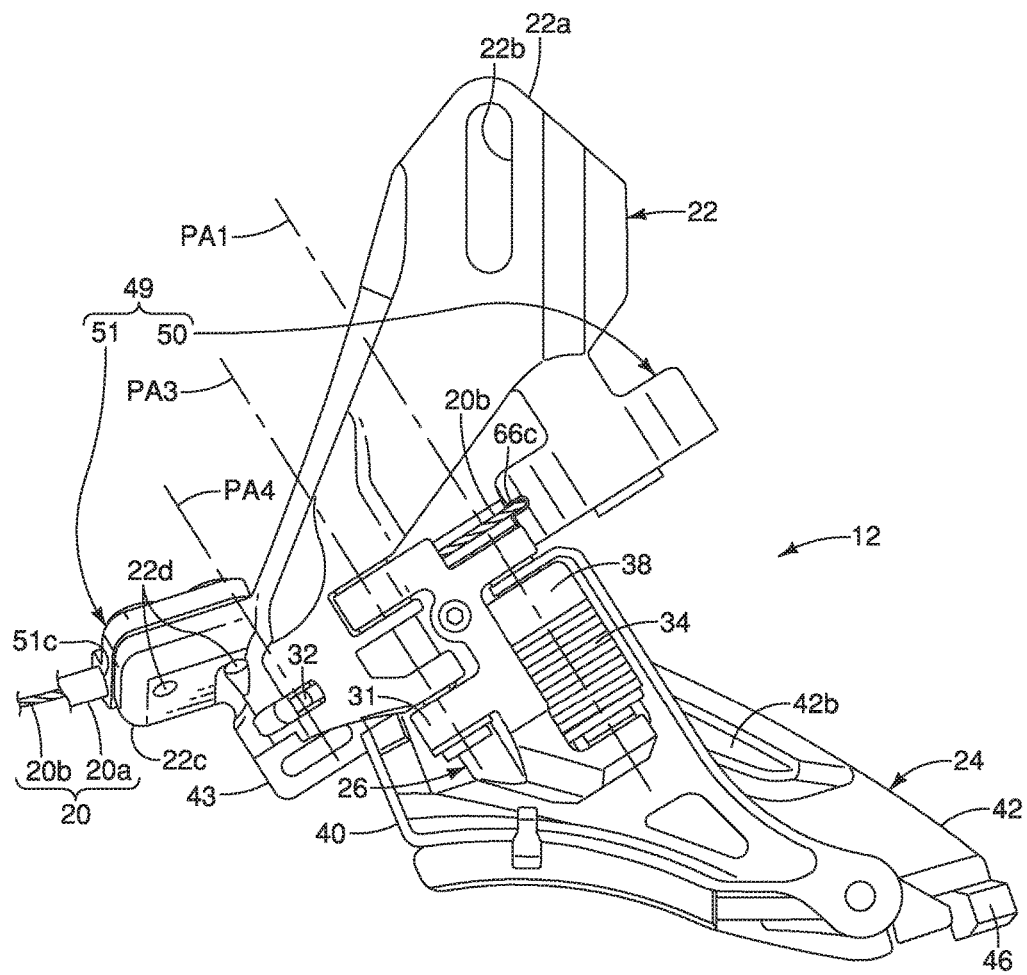
FIG. 3 is an enlarged inner side elevational view of the bicycle front derailleur illustrated in FIGS. 1 and 2.
Figure 9:
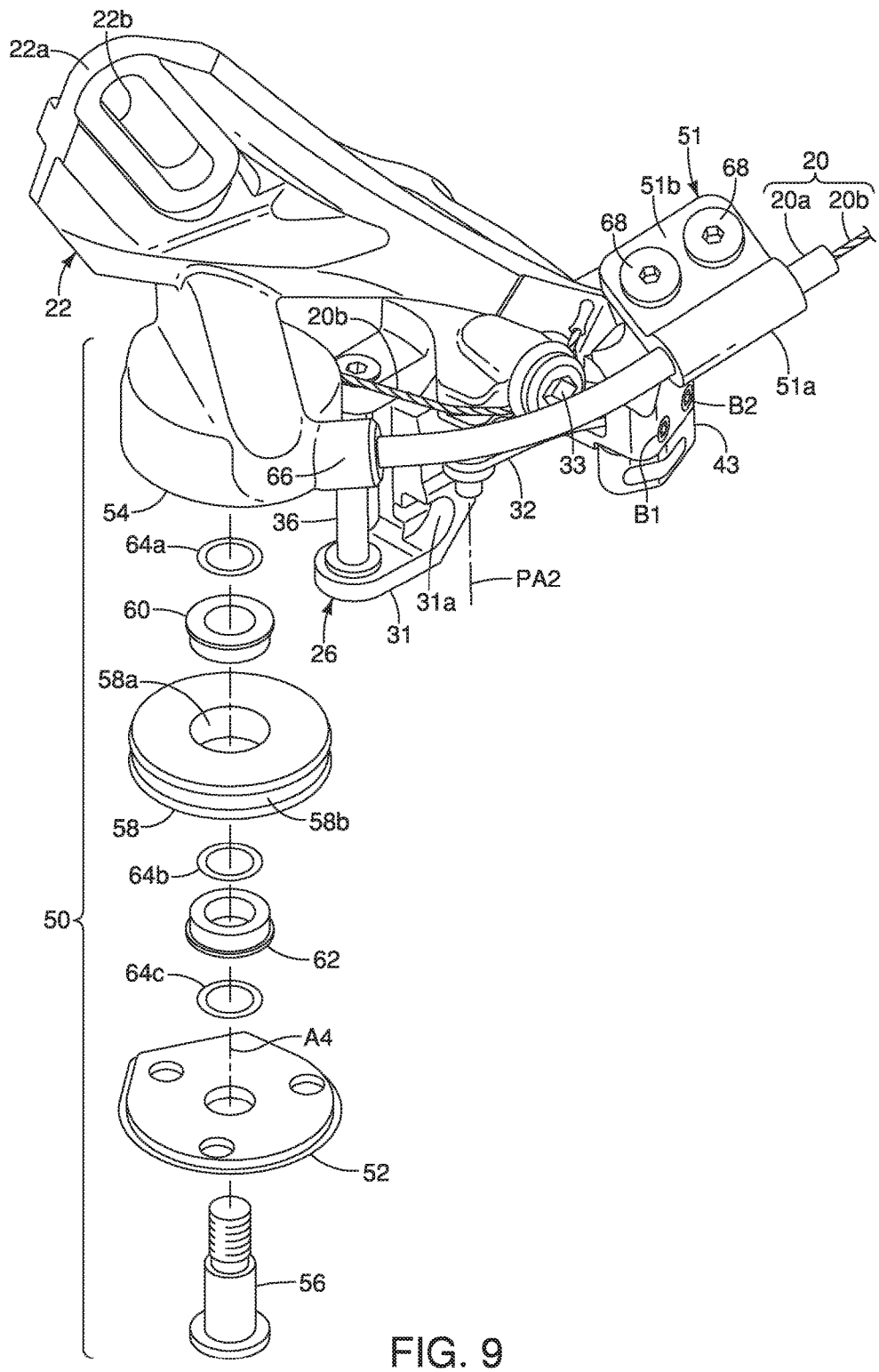
FIG. 9 is an enlarged, exploded perspective view of the cable guiding structure illustrated in FIGS. 1 to 8.

Here, as seen in FIG. 3, the front derailleur 12 further comprises a biasing member 34 that is operatively provided between the base member 22 and the chain guide 24 to bias the chain guide 24 towards the extended position (i.e., top normal). Alternatively, the biasing member 34 could be arranged to bias the chain guide 24 towards the retracted position, if needed and/or desired. In the illustrated embodiment, as seen in FIGS. 3 and 6, the biasing member 34 is a torsion spring. The biasing member 34 has a coiled portion mounted on a pivot pin 36 (FIGS. 6 and 9) that pivotally supports the chain guide 24 to the first link 31 about the first pivot axis PA1. A first end of the biasing member 34 is engaged with the first link 31 of the link mechanism 26. For example, as shown in FIG. 9, a recess 31a in the first link 31 is configured to receive the first end of the biasing member 34. A second end of the biasing member 34 is fixed to an adjustment collar 38 (FIGS. 3, 7 and 8) that is fixed to the chain guide 24.

When the front derailleur 12 is used with the bicycle drive train assembly having only the front sprockets 14 and 16, the chain guide 24 has at least two positions that are established by a shifter (not shown). However, for example, when the front derailleur 12 is used with a bicycle drive train assembly having three front sprockets, the chain guide 24 has three positions that are established by a shifter (not shown).

As seen in FIG. 1, the base member 22 is configured to be attached to the bicycle frame 1 above the front sprockets 14 and 16. The base member 22 is a rigid member that is made of a suitable material, such as a metallic material or a plastic material. As seen in FIGS. 1 through 3, the base member 22 has a frame mounting portion 22a that has a slot 22b for receiving bolts 21a for mounting the front derailleur 12 to the bicycle frame 1 via the seat tube clamp 21.

Now, the chain guide 24 will be discussed in more detail. As shown in FIGS. 4 to 10, the chain guide 24 includes an inner guide plate 40 and an outer guide plate 42. The inner guide plate 40 and the outer guide plate 42 are configured to form a chain guiding slot 44 therebetween, as seen in FIGS. 4 and 5. In the illustrated exemplary embodiment, the chain guide 24 further includes an upstream connecting part 46 and a downstream connecting part 48. The upstream connecting part 46 connects upstream ends of the inner and outer guide plates 40 and 42. The downstream connecting part 48 connects downstream ends of the inner and outer guide plates 40 and 42. The terms "upstream" and "downstream" as used herein mean with respect to a chain driving direction CD (FIG. 1) of the bicycle chain 18 inside the chain guiding slot 44 during a forward pedaling action being applied to the first and second sprockets 14 and 16. In other words, the inner surfaces of the inner and outer guide plates 40 and 42 face each other to form the chain guiding slot 44 therebetween for receiving the bicycle chain 18.

More specifically, the chain guide 24 is moved relative to the base member 22 in an inward direction toward the bicycle frame 1 by pulling the inner cable 20b (i.e., a pulling operation) of the operation cable 20 in response to actuation of the shifter. Thus, in response to a releasing operation of the operation cable 20, the outer guide plate 42 contacts and laterally shifts the bicycle chain 18 such that the bicycle chain 18 moves in an outward direction with respect to the bicycle frame 1 from the first sprocket 14 to the second sprocket 16. Also, the chain guide 24 is moved relative to the base member 22 in an inward direction toward the bicycle frame 1 by pulling the inner cable 20b (i.e., a pulling operation) of the operation cable 20 in response to actuation of a shifter (not shown). In this way, the chain guide 24 can selectively position the bicycle chain 18 over one of the first and second sprockets 14 and 16 in response to the actuation of the shifter.

Referring to FIGS. 4 and 5, in the illustrated embodiment, the outer guide plate 42 includes a base plate portion 42a and a chain guiding portion 42b. The chain guiding portion 42b protrudes from the base plate portion 42a toward the inner guide plate 40. A chain restricting abutment 43 is disposed on a downstream side of the chain guiding portion 42b with respect to the chain driving direction CD, as shown in FIGS. 1 and 3. The chain guiding portion 42b is an arc-shaped projection which is positioned to contact the bicycle chain 18 when the chain guide 24 is moved from the extended position toward the retracted position to move the bicycle chain 18 from a larger front sprocket (i.e., the first sprocket 14) toward an adjacent smaller front sprocket (i.e., the second sprocket 16). In other words, the chain guiding portion 42b is configured to contact a side surface 18a of the bicycle chain 18 when the base member 22 is mounted on the bicycle frame 1 and the chain guide 24 moves from the extended position toward the retracted position. The chain restricting abutment 43 is positioned with respect to the inner guide plate 40 such that a first axial distance D1 is defined between the chain restricting abutment 43 and the inner guide plate 40, and a second axial distance D2 is defined between the chain guiding portion 42b and the inner guide plate 40, as shown in FIGS. 4 and 5. The first axial distance D can be defined as a shortest distance between the chain restricting abutment 43 and the inner guide plate 40 in the axial direction parallel to the rotational center axis A1. The second axial distance D2 can be defined as a shortest distance between the chain guiding portion 42b and the inner guide plate 40 in the axial direction parallel to the rotational center axis A1. The first axial distance D1 is smaller than the second axial distance D2 in a state where the chain guide 24 is in at least one of the retracted position and the extended position. Because the chain restricting abutment 43 is disposed on the base member 22, the first axial distance D1 changes based on the position of the chain guide 24. In the case of the extended position (FIG. 4), the first axial distance D1 is zero. When the chain restricting abutment 43 is provided on the chain guide 24, the chain restricting abutment 43 can be located such that the first axial distance D1 can be zero while the inner guide plate 40 is in both the extended and retracted positions as needed and/or desired. Further, the first axial distance D1 and the second axial distance D2 can be equal to each other in the state where the chain guide 24 is in at least one of the retracted position and the extended position, if needed and/or desired.

In the illustrated embodiment, the outer guide plate 42 is configured to define a non-contact space 42c (FIG. 4) between the chain restricting abutment 43 and the chain guiding portion 42b in the chain driving direction CD. The non-contact space 42c is configured not to contact the bicycle chain 18 when the base member 22 is mounted on the bicycle frame 1 and the chain guide 24 moves from the extended position toward the retracted position. Thus, the chain guiding portion 42b can be distant from the chain restricting abutment 43 in the chain driving direction CD (FIG. 1) via the non-contact space 42c. It can reduce chain shifting force toward the second sprocket 16 to reduce friction between the bicycle chain 18 and the chain restricting abutment 43 during the downshifting operation.

Now, the chain restricting abutment 43 will be discussed in more detail. As shown in FIGS. 1 to 6 and 9, the chain restricting abutment 43 is disposed on the base member 22. In particular, the chain restricting abutment 43 is disposed at a front end of the base member 22. As used herein, the expression "front end" with respect to parts of a front derailleur refers to the end of the part that is location towards a front end of a bicycle that is equipped with the bicycle front derailleur. The chain restricting abutment 43 is disposed on a downwardly facing surface of the base member 22. As used herein, the expression "downwardly facing" should be interpreted relative to a bicycle in an upright riding position on a horizontal surface and that is equipped with the bicycle front derailleur.

The chain restricting abutment 43 includes a protrusion 43a. The protrusion 43a restricts radial outward movement of the bicycle chain 18 during a downshift such that the bicycle chain 18 only moves from the first sprocket 14 to the second sprocket 16 at designated downshift regions of the first sprocket 14. The protrusion 43a is disposed between the inner guide plate 40 and the outer guide plate 42 as viewed from a direction perpendicular to the rotational center axis A1 when the base member 22 is mounted on the bicycle frame 1, as shown in FIGS. 4 and 5. In this position, the chain restricting abutment 43 is configured to restrict the bicycle chain 18 from moving in a radially outward direction of the rotational center axis A1 of a bicycle front sprocket when the base member 22 is mounted on the bicycle frame 1 and the chain guide 24 moves from the extended position toward the retracted position. In particular, the chain restricting abutment 43 is configured to contact an outer periphery 18b of the bicycle chain 18 when the base member 22 is mounted on the bicycle frame 1 and the bicycle chain 18 moves from a larger front sprocket (i.e., the first sprocket 14) toward an adjacent smaller front sprocket (i.e., the second sprocket 16). In this way, the bicycle chain 18 cannot be moved off of the first sprocket 14 except at designated downshift regions of the first sprocket 14.

Preferably, as seen in FIGS. 4 and 5, the chain restricting abutment 43 is a separate member from the base member 22. The chain restricting abutment 43 can be fixedly attached to the base member 22 using a suitable fastening means such as a fastener, a bonding material, etc. More preferably, the chain restricting abutment 43 is replaceable such that the chain restricting abutment 43 can be detached and reattached. In the illustrated embodiment, the chain restricting abutment 43 includes an attachment part that is located in a recess of the base member 22 and fastened to the base member 22 by a pair of limit screws B1 and B2. The limit screws B1 and B2 are used to set the range of movement of the chain guide 24 to establish an extended most position and retracted most position of the chain guide 24. However, the chain restricting abutment 43 can be formed as one-piece member with the base member 22.

The bicycle front derailleur 12 can further include a cable guiding structure 49, as shown in FIGS. 1 to 3. The cable guiding structure 49 includes at least one of a first cable guiding structure 50 and a second cable guiding structure 51, as shown in FIG. 1. One of the first and the second cable guiding structures can be omitted if needed and/or desired. The cable guiding structure 49 is disposed on the base member 22. As shown in FIG. 3, the first cable guiding structure 50 and the second cable guiding structure 51 of the cable guiding structure 49 are disposed on the base member 22. The cable guiding structure 49 is at least partially disposed rearward from the cable attachment portion 33 in a mounting state where the base member 22 is mounted to the bicycle frame 1. In FIGS. 7 and 8, the front end of the bicycle is located towards the left side of the drawing figures. The first cable guiding structure 50 of the cable guiding structure 49 is disposed rearward from the cable attachment portion 33, i.e., to the right, of the cable attachment portion 33.

As shown in FIG. 9, the first cable guiding structure 50 includes a lower housing 52 secured to an upper housing 54 by a fastener, such as a bolt 56, although the lower housing 52 can be secured to the upper housing 54 by any suitable method. A rotatable pulley 58 is rotatably disposed within the first cable guiding structure 50. The rotatable pulley 58 has a pulley opening 58a disposed therein configured to receive a bushing assembly. The bushing assembly includes an upper bushing 60 and a lower bushing 62 disposed in the rotatable pulley opening 58a, thereby allowing the rotatable pulley 58 to rotate about an axis A4 defined by the bolt 56. A plurality of washers 64a. 64b and 64c can be disposed between components of the first cable guiding structure 50. The bolt 56 passes through the lower housing 52, the lower bushing 62, the rotatable pulley 58, the upper bushing 60 and the plurality of washers 64a, 64b and 64c to secure these components to the upper housing 54.

The rotatable pulley 58 has a groove 58b disposed in an outer peripheral surface to guide the inner cable 20b. The groove 58b extends around an entirety of the outer peripheral surface of the rotatable pulley 58.

The first cable guiding structure 50 includes a cable receiving structure 66 configured to receive the operation cable 20, as shown in FIG. 9. The cable receiving structure 66 has a stepped bore that receives the operation cable 20. An outer casing abutment surface 66a is formed between a large diameter bore section and a small diameter bore section of the stepped bore. The large diameter bore section of the first cable guiding structure 50 is an outer casing receiving portion 66b configured to receive an outer casing 20a of the operation cable 20, as shown in FIGS. 7 and 8, such that an end of the outer casing 20a abuts against the outer casing abutment surface 66a. However, the outer casing receiving portion 66b can be omitted from the cable receiving structure 66. In such an embodiment, only the inner cable 20b is inserted into the first cable guiding structure 50. The small diameter bore section of the first cable guiding structure 50 is an inner cable guiding portion 66c disposed adjacent the outer casing receiving portion 66b in the cable receiving structure 66. The inner cable guiding portion 66c has a smaller diameter than the outer casing receiving portion 66b to prevent insertion of the outer casing 20a of the operation cable 20, thereby allowing only the inner cable 20b of the operation cable 20 to be received by the inner cable guiding portion 66c. The inner cable guiding portion 66c guides the inner cable 20b therethrough to the groove 58b of the rotatable pulley 58.

The first cable guiding structure 50 of the cable guiding structure 49 includes a cable exit 66d disposed in the upper housing 54, as shown in FIGS. 7 through 9. The cable exit 66d can be any suitable structure, such as an opening, that allows the inner cable 20b to exit the first cable guiding structure 50. The inner cable 20b exiting through the cable exit 66d of the first cable guiding structure 50 is fixedly connected to the first link 31 by the cable attachment portion 33. The cable exit 66d is disposed rearward (i.e., to the right) from the cable attachment portion 33 in the mounting state, as shown in FIGS. 7 and 8. The front end of the bicycle is located to the left side of the page in FIGS. 7 and 8, such that the cable exit 66d is disposed rearward from the cable attachment portion 33. The cable exit 66d is disposed closer to the bicycle frame 1 (FIG. 1) than the cable attachment portion 33 in the mounting state. The bicycle frame 1 is located towards the bottom of the page in FIGS. 7 and 8, such that the cable exit 66d is disposed closer to the bicycle frame 1 than the cable attachment portion 33.

Figure 10:
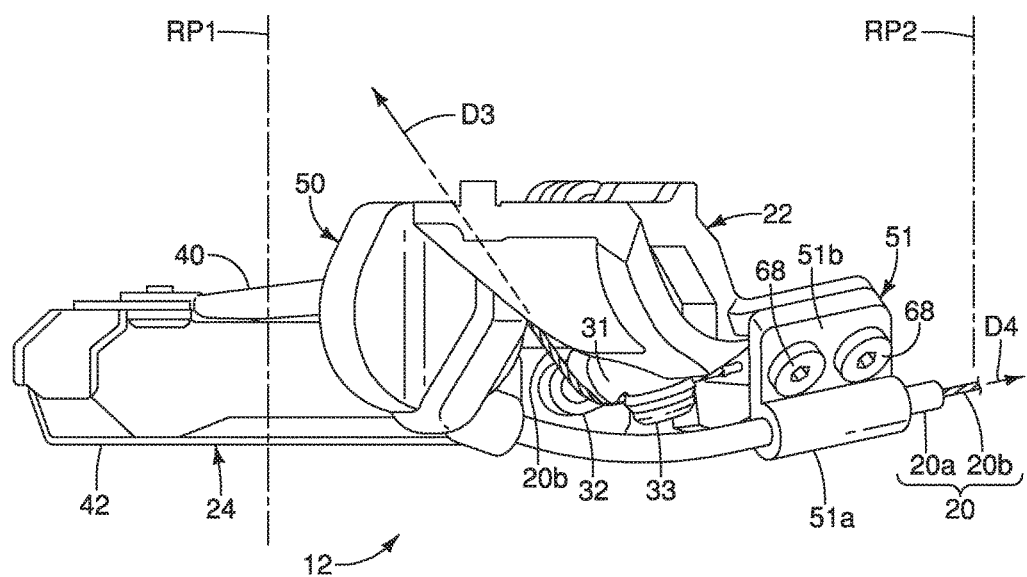
FIG. 10 is a top view of the bicycle front derailleur illustrated in FIGS. 1 to 9.

The first cable guiding structure 50 is configured to guide the operation cable 20 such that the operation cable 20 pulls the link mechanism 26 in a first direction D3 with respect to the base member 22 as the operation cable 20 is pulled in a second direction D4 different from the first direction D3, as shown in FIG. 10. In other words, the first cable guiding structure 50 is configured to guide the operation cable 20 such that the operation cable 20 pulls the link mechanism 26 in the first direction D3 toward a first reference plane RP1 as the operation cable 20 is pulled in the second direction D4 toward a second reference plane RP2 that faces the first reference plane RP1. As can be seen in FIG. 10, the first reference plane RP1 and the second reference plane RP2 can be parallel to each other and spaced apart from each other. The first and second reference planes RP1 and RP2 are planes parallel to a first plane P1 (described later). The first reference plane RP1 is located rearward of the first cable guiding structure 50, for example. Further, the second reference plane RP2 is located forward of the second cable guiding structure 51, for example. In this embodiment, the first cable guiding structure 50 and the second cable guiding structure 51 are disposed between the first and second reference planes RP1 and RP2. More preferably, the link mechanism 26 and the cable guiding structure 49 are disposed between the first and second reference planes RP1 and RP2. However, at least an inlet and an outlet of the operation cable 20 disposed on the first cable guiding structure 50 are preferably disposed between the first and second reference planes RP1 and RP2. Accordingly, when the operation cable 20 is moved in the second direction D4, the configuration of the cable exit 66d (FIGS. 7 and 8) in the first cable guiding structure 50 causes the link mechanism 26 to be pulled in the first direction D3, which is different from the second direction D4. When the second direction D4 is toward the second reference plane RP2, the first direction D3 is toward the first reference plane RP1, which is parallel to the second reference plane RP2. As shown in FIG. 10, a direction towards the right side of the page corresponds to a forward direction of the bicycle frame. Accordingly, the first direction D3 is toward a rear of the bicycle, whereas the second direction D4 is toward the front of the bicycle, i.e., the second direction D4 is generally opposite to the first direction D3.

The second cable guiding structure 51 of the cable guiding structure 49, as shown in FIGS. 2 and 6, includes an outer casing receiving portion 51a and a mounting portion 51b. The second cable guiding structure 51 is configured to be attached to the operation cable 20. The outer casing receiving portion 51a has a substantially tubular shape with an opening 51c extending therethrough configured to receive the outer casing 20a of the operation cable 20 therethrough. The mounting portion 51b is preferably planar and integrally formed with the outer casing receiving portion 51a as a single member. The mounting portion 51b has at least one opening configured to receive a fastener 68 to mount the second cable guiding structure 51 to a cable guiding structure mounting portion 22c of the base member 22. The cable guiding structure mounting portion 22c has at least one opening 22d aligned with the at least one opening in the second cable guiding structure 51 to receive the fastener 68 to mount the cable attachment portion 33 to the base member 22.

As seen in FIGS. 1 and 2, the cable guiding structure 49 is configured to guide the operation cable 20 forwardly from the cable guiding structure 49 within a sector having an angle α of 150 degrees around the crank axis A1 from an upper radius lying in a first plane P1 that is perpendicular to a second plane P2 containing the crank axis A1 and the rear wheel axis A2 in a mounted state where the base member 22 is mounted to the bicycle frame 1. The cable exit axis A3 extends from the cable guiding structure 49 of the front derailleur 12 such that the cable exit axis A3 enters into a sector of the bicycle frame 1 having an angle α of 150 degrees as measured around the crank axis, or rotational center axis, A1 from an upper radius lying in the first plane P1 that is perpendicular to the second plane P2 containing the crank axis, or rotational center axis, A1 and the rear wheel axis A2.

With this configuration, a transmission efficiency of the operation cable 20 from the shifter to the front derailleur 12 can be improved compared to a conventional top pull cable route that the operation cable usually runs in an upward direction along a rear side of the seat tube from a top pull front derailleur, and then curves forwardly and runs along an upper side of a top tube of the bicycle frame towards the handlebar. Further, the transmission efficiency of the operation cable from the shifter to the front derailleur can be improved compared to a conventional bottom pull cable route that the operation cable usually runs in a downward direction along the rear side of the seat tube, and then curves under a hanger tube in a forward and upward direction where the operation cable runs along the underside of the down tube towards the handlebar. For example, by using cable exit configuration shown in FIG. 1, a cable pulling load of the operation cable 20 at the shifter is decreased relative to the conventional top and bottom pull front derailleurs.

Second Exemplary Embodiment

Figure 11:
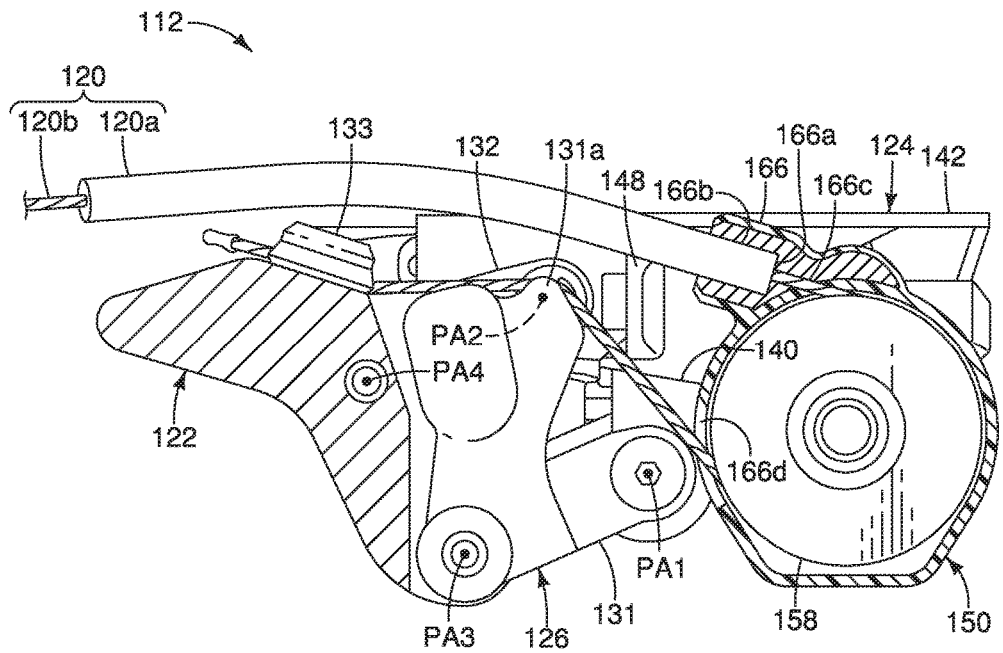
FIG. 11 is an enlarged top view of a bicycle front derailleur having a cable attachment portion disposed on a base member with a chain guide in an extended position with respect to the base member in accordance with another illustrated embodiment.
Figure 12:
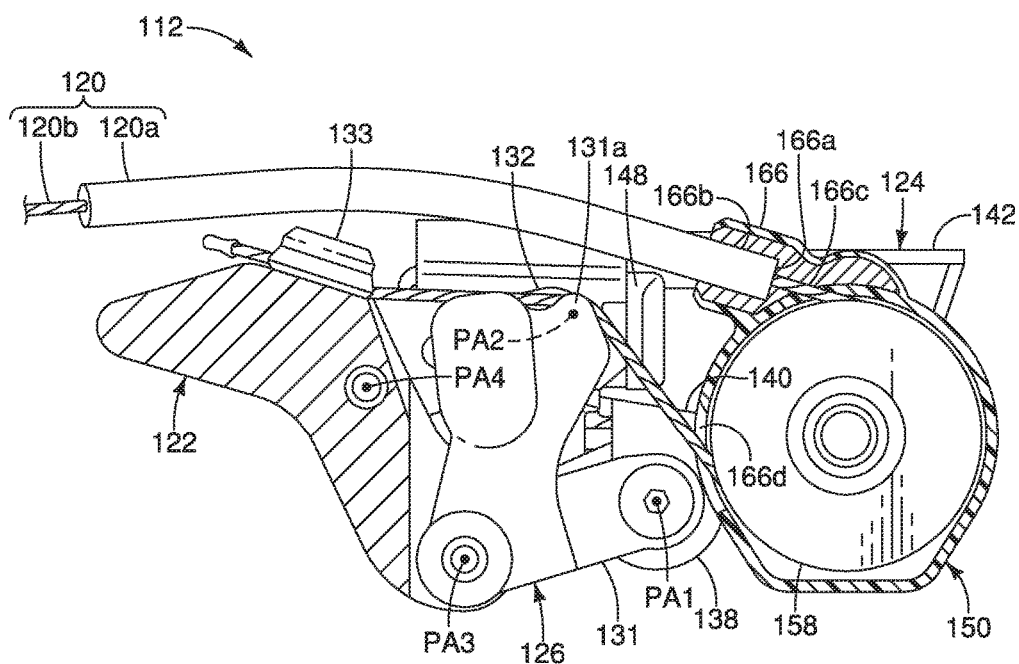
FIG. 12 is an enlarged top view of the bicycle front derailleur illustrated in FIG. 11 with the chain guide in a retracted position with respect to the base member.

As shown in FIGS. 11 and 12, a bicycle front derailleur 112 in accordance with a second exemplary embodiment of the present invention is substantially similar to the bicycle front derailleur 12 of the first exemplary embodiment except for the differences described below. Similar parts are identified with similar reference numerals, except increased by 100 (i.e., 1xx, accordingly).

Referring now to FIGS. 11 and 12, the bicycle front derailleur 112 is configured to be mounted to the bicycle frame similarly to the first exemplary embodiment illustrated in FIG. 1 for laterally shifting the bicycle chain 18 between the first and second sprockets 14 and 16. In particular, the front derailleur 112 is a cable operated front derailleur that is operatively connected to a shifter (not shown) using the operation cable 20 in the same manner as in the first exemplary embodiment, as discussed above. Thus, the bicycle front derailleur 112 is used with the bicycle frame 1 and the first and second sprockets 14 and 16, as discussed above.

Referring to FIGS. 11 and 12, the front derailleur 112 basically comprises a base member 122, a chain guide 124 and a link mechanism 126. The chain guide 124 is movably mounted to the base member 122 to move from an extended position (FIG. 11) to a retracted position (FIG. 12).

As seen in FIGS. 11 and 12, the front derailleur 112 further comprises a link mechanism 126 that couples the chain guide 124 to the base member 122 between the retracted position and the extended position in response to movement of the operation cable 120. The link mechanism 126 includes the first link 131 and the second link 132 that interconnect the base member 122 and the chain guide 124 together for lateral movement with respect to the bicycle frame 1 (FIG. 1). The first link 131 is pivotally connected to the chain guide 124 about the first pivot axis PA1.

A cable attachment portion 133 is disposed on the base member 122, as shown in FIGS. 11 and 12. The cable attachment portion 133 is screwed into a threaded bore of the base member 122 for fixedly attaching the inner cable 120b to the base member 122. The first link 131 guides the inner cable 120b from the first cable guiding structure 150 of the cable guiding structure to the cable attachment portion 133. The first link 131 has a guiding surface 131a to facilitate engaging the inner cable 120b and guiding the inner cable 120b from the first cable guiding structure 150 of the cable guiding structure to the cable attachment portion 133. The inner cable 120b engages the guiding surface 131a of the first link 131 to transmit a pulling force to the link mechanism 126 through the first link 131.

Operation of the front derailleur 112 is substantially similar to that of the front derailleur 12 of the first exemplary embodiment. The cable guiding structure is configured to guide the operation cable 120 such that the operation cable 120 pulls the link mechanism 126 in a first direction D3 (FIG. 10) with respect to the base member 122 as the operation cable 120 is pulled in a second direction D4 (FIG. 10) different from the first direction D3. In other words, the first cable guiding structure 150 is configured to guide the operation cable 120 such that the operation cable 120 pulls the link mechanism 126 in the first direction D3 toward a first reference plane RP1 as the operation cable 120 is pulled in the second direction D4 toward a second reference plane RP2 that faces the first reference plane RP1. The inner cable 120b engages the guiding surface 131a of the first link 131 such that during the pulling operation the movement of the inner cable 120b causes the link mechanism 126 to move from the extended position (FIG. 11) to the retracted position (FIG. 12). A biasing member 34 (FIG. 3) returns the link mechanism 126 to the extended position when the operation cable 120 is released.

The exemplary embodiment of the front derailleur 112 shown in FIGS. 11 and 12 includes the link mechanism 126 and the cable guiding structure 49 (FIGS. 1 and 6). The link mechanism 126 couples the chain guide 124 to the base member 122 between the retracted position and the extended position in response to a movement of the operation cable 120. The link mechanism 126 includes the first link 131 that is configured such that the first pivot axis PA1 moves in a forward-rearward direction, while the chain guide 124 moves between the retracted position (FIG. 12) and the extended position (FIG. 11) in a mounted state where the base member 122 is mounted to the bicycle frame 1 (FIG. 1).

The cable guiding structure 49 (FIGS. 1 and 6) is configured to guide the operation cable 120 such that the operation cable 120 pulls the link mechanism 126 in a first direction D3 (FIG. 10) with respect to the base member 122 as the operation cable 120 is pulled in a second direction D4 (FIG. 10) different from the first direction D3. Accordingly, the front derailleur 112 is not limited to a "top normal front derailleur." Alternatively, the front derailleur 112 can be a "low normal front derailleur" including a biasing member operatively disposed between the base member and the chain guide to bias the chain guide towards the retracted position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle front derailleur. Accordingly, these directional terms, as utilized to describe the bicycle front derailleur should be interpreted relative to a bicycle in an upright riding position on a horizontal surface and that is equipped with the bicycle front derailleur. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, this invention can be applied to an electric front derailleur including an electric motor to actuate a linkage mechanism to move a chain guide in accordance with an electrical signal. Also unless specifically stated otherwise, the size, shape, location or orientation of the various components can be changed as needed and/or desired so long as the changes do not substantially affect their intended function. Further, unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front derailleur comprising:
   a base member configured to be fixedly coupled to a bicycle;
   a chain guide configured to guide a chain;
   a link mechanism coupling the chain guide to the base member between a retracted position and an extended position in response to a movement of an operation cable, the link mechanism including a first link pivotally connected to the chain guide about a first pivot axis, the first link being configured such that the first pivot axis moves in a forward-rearward direction, while the chain guide moves between the retracted position and the extended position in a mounted state where the base member is mounted to the bicycle frame; and
   a biasing member operatively disposed between the base member and the chain guide to bias the chain guide towards the extended position.

2. The bicycle front derailleur according to claim 1, further comprising
   a cable guiding structure configured to guide the operation cable such that the operation cable pulls the link mechanism in a first direction with respect to the base member as the operation cable is pulled in a second direction different from the first direction.

3. A bicycle front derailleur comprising:
   a base member configured to be fixedly coupled to a bicycle;
   a chain guide configured to guide a chain;
   a link mechanism coupling the chain guide to the base member between a retracted position and an extended position in response to a movement of an operation cable, the link mechanism including a first link pivotally connected to the chain guide about a first pivot axis, the first link being configured such that the first pivot axis moves in a forward-rearward direction, while the chain guide moves between the retracted position and the extended position, in a mounted state where the base member is mounted to the bicycle frame; and
   a cable guiding structure configured to guide the operation cable such that the operation cable pulls the link mechanism in a first direction toward a first reference plane as the operation cable is pulled in a second direction toward a second reference plane that faces the first reference plane.

4. The bicycle front derailleur according to claim 1, wherein
   the link mechanism includes a second link pivotally connected to the chain guide about a second pivot axis,
   the second link is configured such that the second pivot axis moves in the forward-rearward direction, while the chain guide moves between the retracted position and the extended position in the mounted state.

5. A bicycle front derailleur attachable to a bicycle having a crank axis and a rear wheel axis which is parallel to the crank axis, the bicycle front derailleur comprising:
   a base member configured to be fixedly coupled to a bicycle frame;
   a chain guide configured to guide a chain;
   a link mechanism movably coupling the chain guide to the base member between a retracted position and an extended position in response to a movement of an operation cable;
   a cable guiding structure configured to guide the operation cable so as to be pulled forwardly from the cable guiding structure within a sector having an angle of 150 degrees around the crank axis from an upper radius lying in a first plane that is perpendicular to a second plane containing the crank axis and the rear wheel axis in a mounted where the base member is mounted to the bicycle frame; and
   a biasing member operatively disposed between the base member and the chain guide to bias the chain guide towards the extended position.

6. The bicycle front derailleur according to claim 5, wherein
   the link mechanism includes a first link and a second link pivotally connected to the chain guide.

7. The bicycle front derailleur according to claim 2, further comprising
   a cable attachment portion configured to be attached to an operation cable.

8. The bicycle front derailleur according to claim 7, wherein
   the first link is disposed closer to the bicycle frame than the second link in the mounted state; and
   the cable attachment portion is disposed on the first link.

9. The bicycle front derailleur according to claim 8, wherein
   the cable attachment portion protrudes from the first link in a direction away from the bicycle frame in the mounted state.

10. The bicycle front derailleur according to claim 7, wherein
    the cable attachment portion is disposed on the base member.

11. The bicycle front derailleur according to claim 2, wherein
    the second direction is generally opposite to the first direction.

12. The bicycle front derailleur according to claim 2, wherein
    the cable guiding structure is disposed to the base member.

13. The bicycle front derailleur according to claim 2, wherein
    the cable guiding structure includes an outer casing receiving portion.

14. The bicycle front derailleur according to claim 2, wherein the cable guiding structure includes an inner cable guiding portion.

15. The bicycle front derailleur according to claim 2, wherein the cable guiding structure includes a rotatable pulley.

16. The bicycle front derailleur according to claim 7, wherein the cable guiding structure is at least partially disposed rearward from the cable attachment portion in the mounting state.

17. The bicycle front derailleur according to claim 7, wherein the cable guiding structure includes a cable exit that is disposed rearward from the cable attachment portion in the mounting state.

18. The bicycle front derailleur according to claim 7, wherein the cable guiding structure includes a cable exit that is disposed closer to the bicycle frame than the cable attachment portion in the mounting state.

* * * * *